United States Patent
Klosowski et al.

(10) Patent No.: US 6,414,680 B1
(45) Date of Patent: Jul. 2, 2002

(54) SYSTEM, PROGRAM PRODUCT AND METHOD OF RENDERING A THREE DIMENSIONAL IMAGE ON A DISPLAY

(75) Inventors: James T. Klosowski, Rye, NY (US); Claudio T. Silva, Mahwah, NJ (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/296,077

(22) Filed: Apr. 21, 1999

(51) Int. Cl.⁷ .................................................. G06T 17/00
(52) U.S. Cl. ....................................................... 345/423
(58) Field of Search ................................ 345/418, 419, 345/420, 421, 422, 423, 424

(56) References Cited

U.S. PATENT DOCUMENTS

| | | |
|---|---|---|
| 5,751,291 A | 5/1998 | Olsen et al. |
| 5,825,369 A | 10/1998 | Rossignac et al. |

Primary Examiner—Cliff N. Vo

(74) Attorney, Agent, or Firm—Louis J. Peercello; Fitch, Even, Tabin & Flannery

(57) ABSTRACT

A Prioritized-Layered Projection (PLP) method and system for optimizing the rendering high-depth complexity scenes. Objects in each frame are prioritized with an estimation of the visible set within the rendered frame. A priority order for only the primitives in visible sets within the frame are computed "on demand" to maximize the likelihood of rendering visible primitives before rendering occluded ones. For a fixed budget, such as, time or number of triangles, rendering is constrained to a geometry budgeted priority. The method includes two main steps: an occupancy-based tessellation of space; and a solidity-based traversal algorithm. By first computing an occupancy-based tessellation of space, more cells result where there are more geometric primitives. In this spatial tessellation, each cell is assigned a "solidity" value directly proportional to its likelihood of occluding other cells. In its simplest form, a cell's solidity value is directly proportional to the number of primitives contained within the cell. Cells are marked for projection, and the geometric primitives contained within the marked cells are rendered. Cell solidity, and other view-dependent information determines the order cells are rendered.

27 Claims, 15 Drawing Sheets

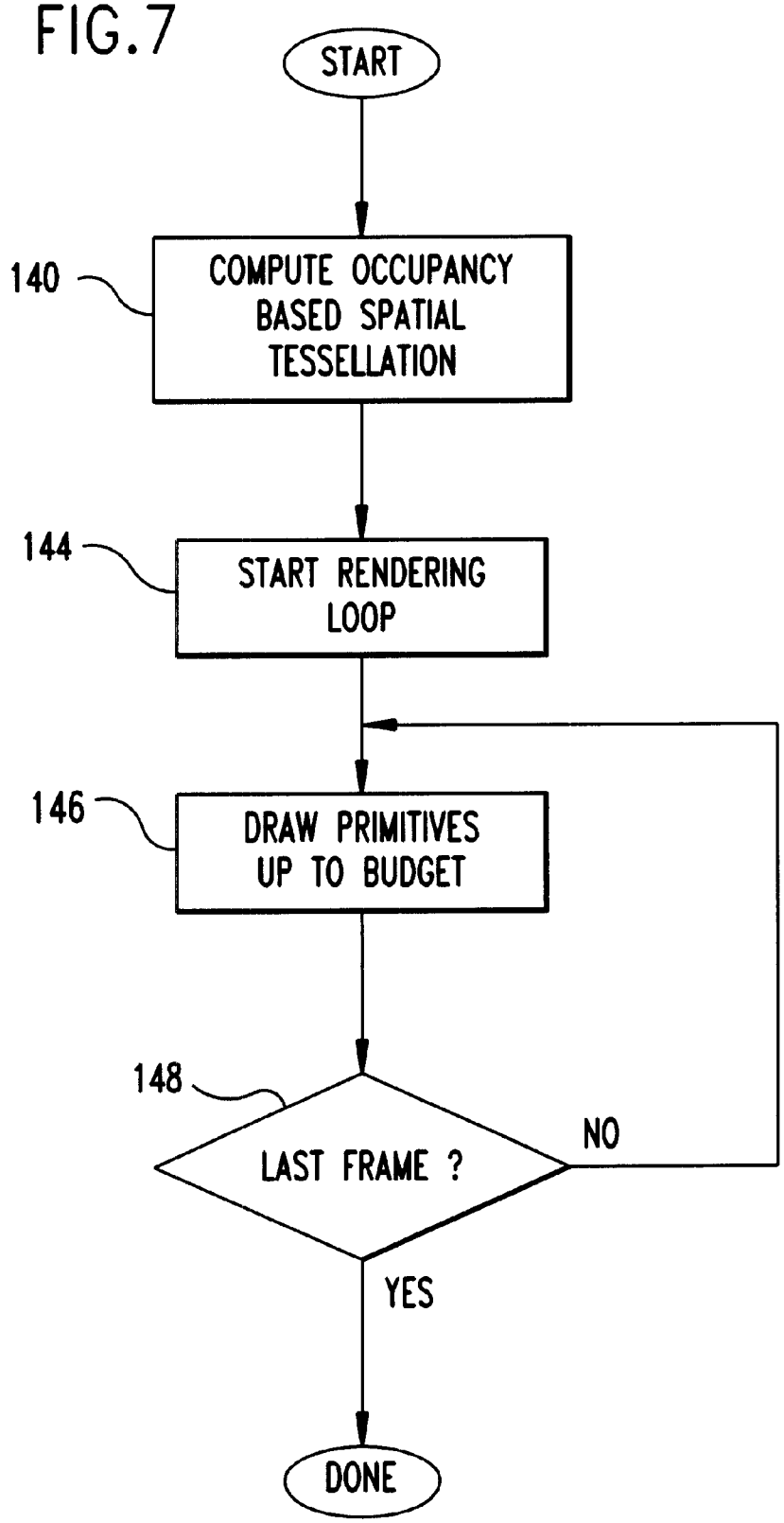

| | |
|---|---|
| 1460 | while (*empty(Q)* != true) |
| 1462 |     c = *min(Q)* |
| 1464 |     *project*(c) |
| 1466 |     if ((*reached_budget*() == true) |
| 1468 |         break; |
| 1470 |     for each *n*; *n = cell_adjacent_to*(c) |
| 1472 |         If ((*projected*(*n*) == true) |
| 1474 |             continue; |
| 1476 |         ρ = *update_solidity*(*n*,c) |
| 1478 |         *enqueue*(*n*,ρ) |

FIG.8A

| | |
|---|---|
| 760 | $\rho_B = \frac{|A|}{\rho_{max}} + (\vec{v} \cdot \vec{n}_B) * \rho_A$ |
| 762 | if (*star_shaped*($\vec{v}$, B) ==false) |
| 764 |     $\rho_B$ = *apply_penalty_factor*($\rho_B$) |
| 766 | return $\rho_B$ |

FIG.10A

SYSTEM, PROGRAM PRODUCT AND METHOD OF RENDERING A THREE DIMENSIONAL IMAGE ON A DISPLAY

BACKGROUND OF THE INVENTION

1. Field of the Invention

The present invention generally relates to image processing systems and, more particularly, to image processing systems capable of finding visible points or fragments that are connected by a line segment to the eyepoint that meets the closure of no other primitive within the same scene.

2. Background Description

In a given scene, $S$, finding visible points or fragments that are connected to the eyepoint by a line segment that meets the closure of no other primitive within the same scene is a well known image processing problem. This visibility problem is discussed by D. Dobkin and S. Teller "Computer Graphics," Handbook of Discrete and Computational Geometry, chapter 42, pages 779–96. CRC Press, Boca Raton, Fla., 1997 (hereinafter Dobkin).

As described in Dobkin, the scene, $S$, is composed of modeling primitives (e.g., triangles, or spheres), and a viewing frustum defining an eye position, a view direction, and a field of view. For any scene with n primitives, the complexity of the set of visible fragments might be quadratic as a function of n. One well known approach to solving this visibility problem is the Z-buffer algorithm of E. Catmull as described in "A Subdivision Algorithm for Computer Display of Curved Surfaces", PhD thesis, Dept. of Computer Science, University of Utah, December 1974.

The Z-buffer algorithm exploits the discrete nature of the screen to solve the visibility problem in time proportional to n, because it only touches each primitive once. The Z-buffer algorithm solves the visibility problem by maintaining a depth value for each pixel and, only updating the pixels when rendering geometry closer to the eyepoint. For high-depth complexity scenes, the Z-buffer algorithm might result in overdrawing each pixel a considerable number of times. However, despite this potential inefficiency, the Z-buffer is a popular algorithm and widely implemented in hardware.

Given the wide availability of the Z-buffer approach but with exact visibility computations potentially being too costly in terms of computer time and associated hardware costs, alternative approaches are being sought. One approach is to use the Z-buffer as a filter and design algorithms that compute an approximation of the visible set to reduce the amount of overdraw. More precisely, the visible set $\mathcal{V}$ (a subset of $S$) is defined to be a set of modeling primitives that contribute at least one pixel to the screen. In computer graphics, visibility-culling research has focused, mainly, on algorithms for computing estimations of $\mathcal{V}$, then, obtaining correct images using the Z-buffer.

The simplest examples of visibility-culling algorithms are the "backface" and "view-frustum" algorithms, as described by Foley et al. "Computer Graphics, Principles and Practice, Second Edition," Addison-Wesley, Reading, Mass., 1990. Backface-culling algorithms avoid rendering geometric primitives that face away from the viewer; while viewing-frustum culling algorithms avoid rendering geometric primitives that are outside of the viewing frustum.

Still another approach is using hierarchical occlusion maps as described by Zhang et al. in "Visibility Culling Using Hierarchical Occlusion Maps," SIGGRAPH 97 Conference Proceedings, pages 77–88, 1997. The hierarchical occlusion map approach solves the visibility problem by using two hierarchies, an object-space bounding volume hierarchy and another hierarchy of image space occlusion maps. A set of objects (occluders) are selected for each frame from a pre-computed database. The occluders are used to cull unseen geometric primitives. Closely related to this technique is the hierarchical Z-buffer described in U.S. Pat. No. 5,579,455 entitled "Rendering of 3d Scenes on a Display Using Hierarchical Z-buffer Visibility" to Greene et al., which is incorporated herein by reference.

Yet another approach is object-space visibility culling. One such object-space visibility culling technique, described by Teller and Sequin in "Visibility Preprocessing for Interactive Walkthroughs," Computer Graphics, pages 61–69, July 1991 (hereinafter Teller). Teller teaches dividing space into cells and, then, preprocessing the cells for potential visibility. The Teller technique works particularly well for architectural models. These state of the art visibility-culling techniques mostly exploit the presence of large occluders, and keep track of spatial extents over time.

In yet another approach, Funkhouser and Sequin in "Adaptive Display Algorithm for Interactive Frame Rates During Visualization of Complex Virtual Environments," Computer Graphics, pp. 247–54, 1993, describe a constant-frame rendering system.

However, all of the above state of the art techniques for occlusion-culling have several drawbacks. First of all, the simple backface and viewing-frustum culling algorithms of Foley et al. are unable to cull "overdraw" geometry. For this type of culling, more complex techniques that lead to substantial improvements in rendering time are needed. Unfortunately, these techniques for tighter estimation of the visible set do not come easily. Most currently proposed techniques are quite involved and complex, typically requiring computation of complex object hierarchies in both 3- and 2- space.

In addition to the above problems, typically, a significant portion of the geometric primitives that are not visible are not culled by the prior art occlusion culling methods. Further, these prior art methods do not allow a user-defined budget to be used for culling, e.g., specifying a limit on the number of primitives to render, and therefore, these prior art methods are not time-critical.

Thus, there is a need for more efficient rendering techniques for optimizing the rendering of high-depth complexity scenes.

SUMMARY OF THE INVENTION

It is therefore a purpose of the present invention to efficiently select geometric primitives to be rendered in an image;

It is another purpose of the present invention to efficiently select geometric primitives to be rendered within an image processing system's budget constraints;

It is yet another purpose of the present invention to efficiently select geometric primitives to be rendered within an image processing system's time constraints.

The present invention is a Prioritized-Layered Projection (PLP) technique and system for optimizing the rendering of high-depth complexity scenes. Objects in each frame are prioritized with an estimation of the visible set within the rendered frame. Visible sets are not explicitly computed, but, instead, a priority order is computed "on demand" to maximize the likelihood of rendering visible primitives before rendering occluded ones. For a fixed budget, e.g., time or number of triangles, the rendering technique of the present invention constrains that geometry rendering to the budgeted priority.

The preferred embodiment of the present invention includes two main steps: (1) an occupancy-based tessellation of space; and (2) a solidity-based traversal algorithm. By first computing an occupancy-based tessellation of space, more cells result where there are more geometric primitives. In this spatial tessellation, each cell is assigned a "solidity" value directly proportional to its likelihood of occluding other cells. In its simplest form, a cell's solidity value is directly proportional to the number of primitives contained within the cell. Cells are marked for projection, and the geometric primitives contained within the marked cells are rendered. The present invention uses the cells solidity and other view-dependent information to determine the ordering in which to project cells.

BRIEF DESCRIPTION OF THE DRAWINGS

The foregoing and other objects, aspects and advantages will be better understood from the following detailed preferred embodiment description with reference to the drawings, in which:

FIG. 7 is a flow chart of the preferred embodiment geometric rendering process of FIG. 4 showing the rendering loop of the solidity based traversal step;

FIGS. 8A–B are pseudo-code and a corresponding flow chart for the rendering loop step executed in FIG. 7;

FIGS. 10A–B are pseudo-code and a corresponding flow chart of a preferred solidity computation process of FIGS. 8A–B;

DETAILED DESCRIPTION OF A PREFERRED EMBODIMENT OF THE INVENTION

Figure 1:
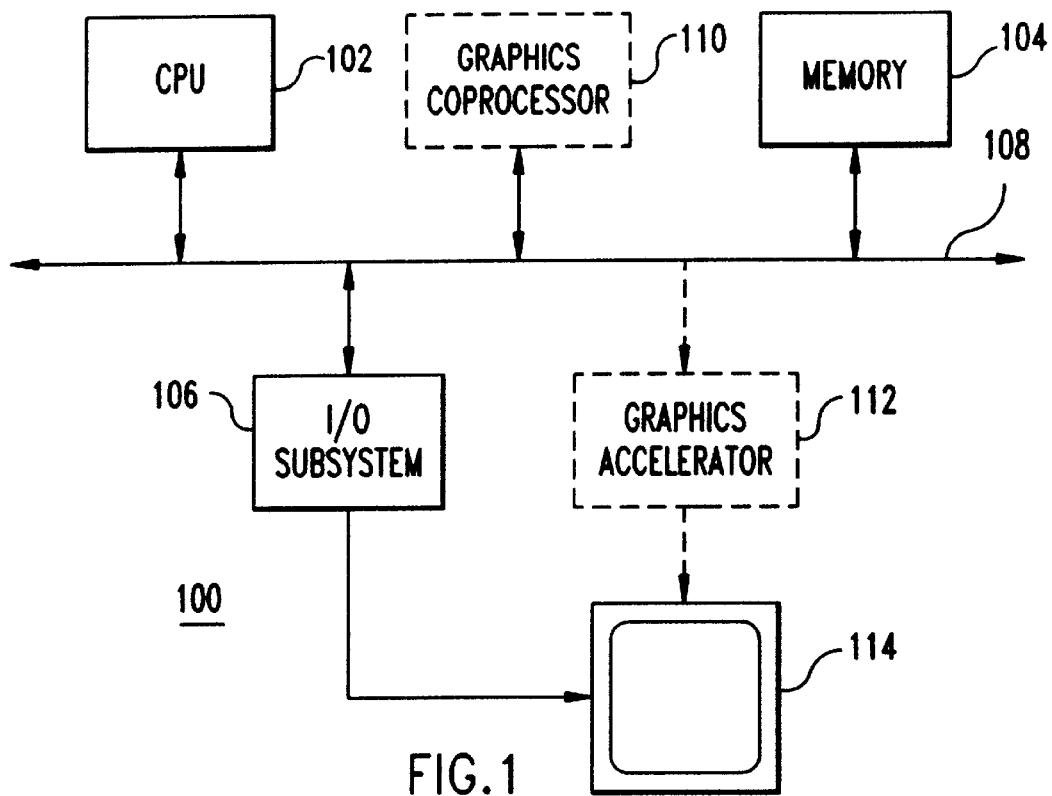
FIG. 1 is a block diagram of a preferred embodiment image processing system.

Referring now to the drawings, and more particularly, FIG. 1 is a block diagram of a preferred embodiment image processing system 100 that includes, as a minimum, a Central Processing Unit (CPU) 102, a memory subsystem 104 and an Input Output (I/O) subsystem 106 communicating through a data bus 108. Optionally, the system may include a graphics coprocessor 110 to offload graphics processing from the CPU 102, thereby reducing CPU computation-intensive tasks. Additionally, the preferred embodiment system 100 may include an optional graphics accelerator subsystem 112. Processed images are visualized on a display 114.

Figure 2:
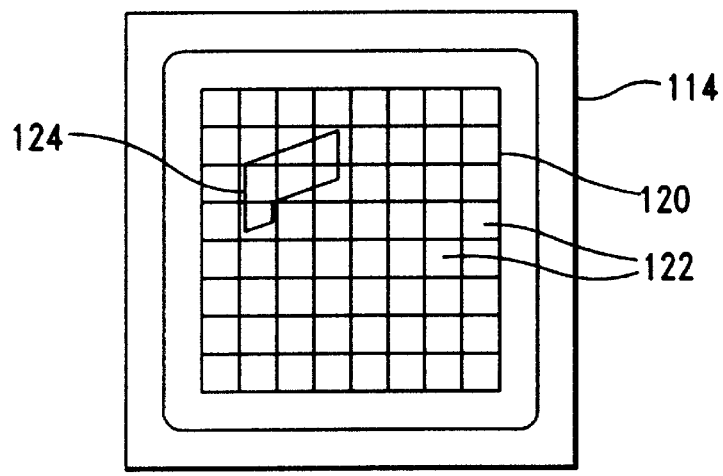
FIG. 2 is an example of an image rendered on display.

FIG. 2 is an example of an image rendered on display 114. The display area 120 is subdivided into display cells 122, normally referred to as pixels. A primitive 124, shown on the display 114, is a portion of the displayed three-dimensional scene. The primitive 124 is a projection of a three-dimensional primitive onto a two-dimensional "image space" of the display area 120. In this example, the projection of the primitive 124 occupies a portion of seven pixels 122.

Figure 3:
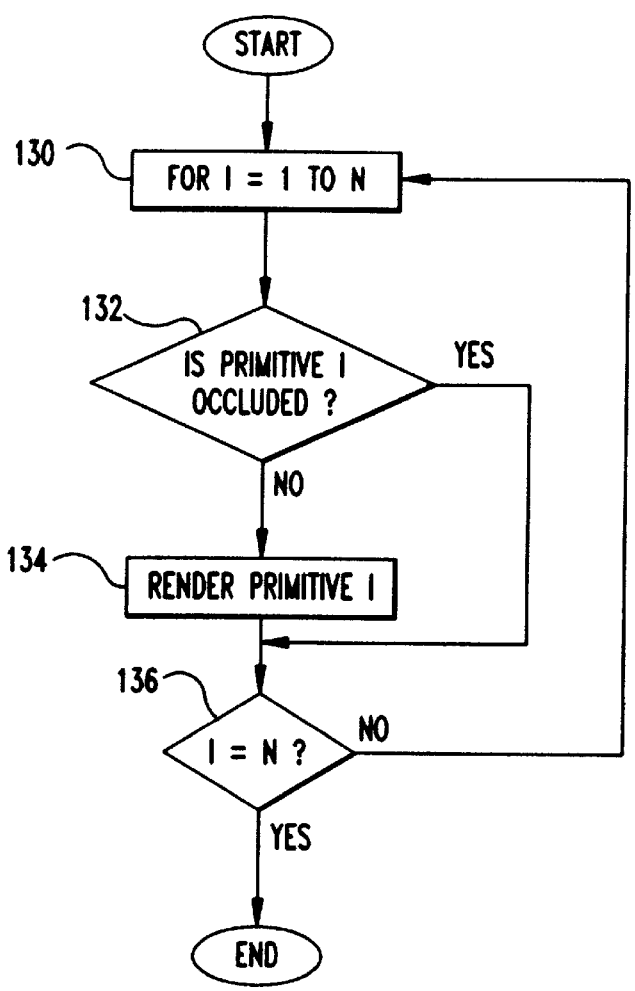
FIG. 3 is a basic occlusion culling process flow chart for deciding which primitives are to be rendered.

FIG. 3 is a basic occlusion culling process flow chart such as may be currently practiced for deciding which primitives, preferably triangles, are to be rendered. Accordingly, the culling process begins in step 130 as a pointer, I, is set to point to the first primitive. In step 132, the primitive is checked to determine if it is occluded by other primitives and, if it is, that occluded primitive is skipped, i.e., not rendered. If, however, the primitive is not occluded then, in step 134 the primitive is rendered. Then, in step 136 I is checked to determine if the last primitive has been processed and, if not, I is set to point to the next primitive in step 130. The process repeats until all unoccluded primitives have been identified and rendered.

Figure 4:
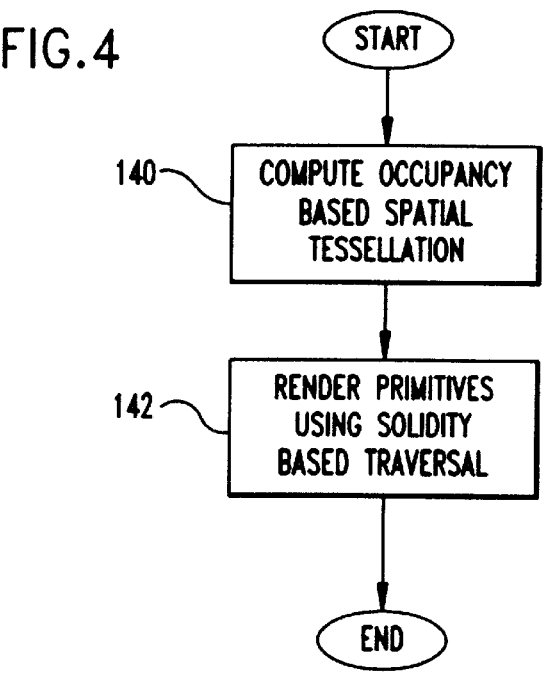
FIG. 4 is a flow chart of the preferred embodiment geometric rendering process according to the present invention.

FIG. 4 is a flow chart of the preferred embodiment geometric rendering process according to the present invention. The preferred embodiment geometric rendering and culling process begins in first major step 140 with an occupancy-based tessellation of space, wherein a 3-space covered by the scene is decomposed into disjoint cells. Then, in second major step 142 scenes are rendered using a solidity-based traversal algorithm. In the spatial tessellation, each cell is assigned a "solidity" value directly proportional to its likelihood of occluding other cells. In its simplest form, a cell's solidity value is directly proportional to the number of polygons in the cell in the line of sight. Cells are marked for projection in step 142 and the geometric primitives contained within the marked cells are rendered. Each cell's solidity as well as other view-dependent information are used to determine the ordering in which the cells are projected.

Figure 5:
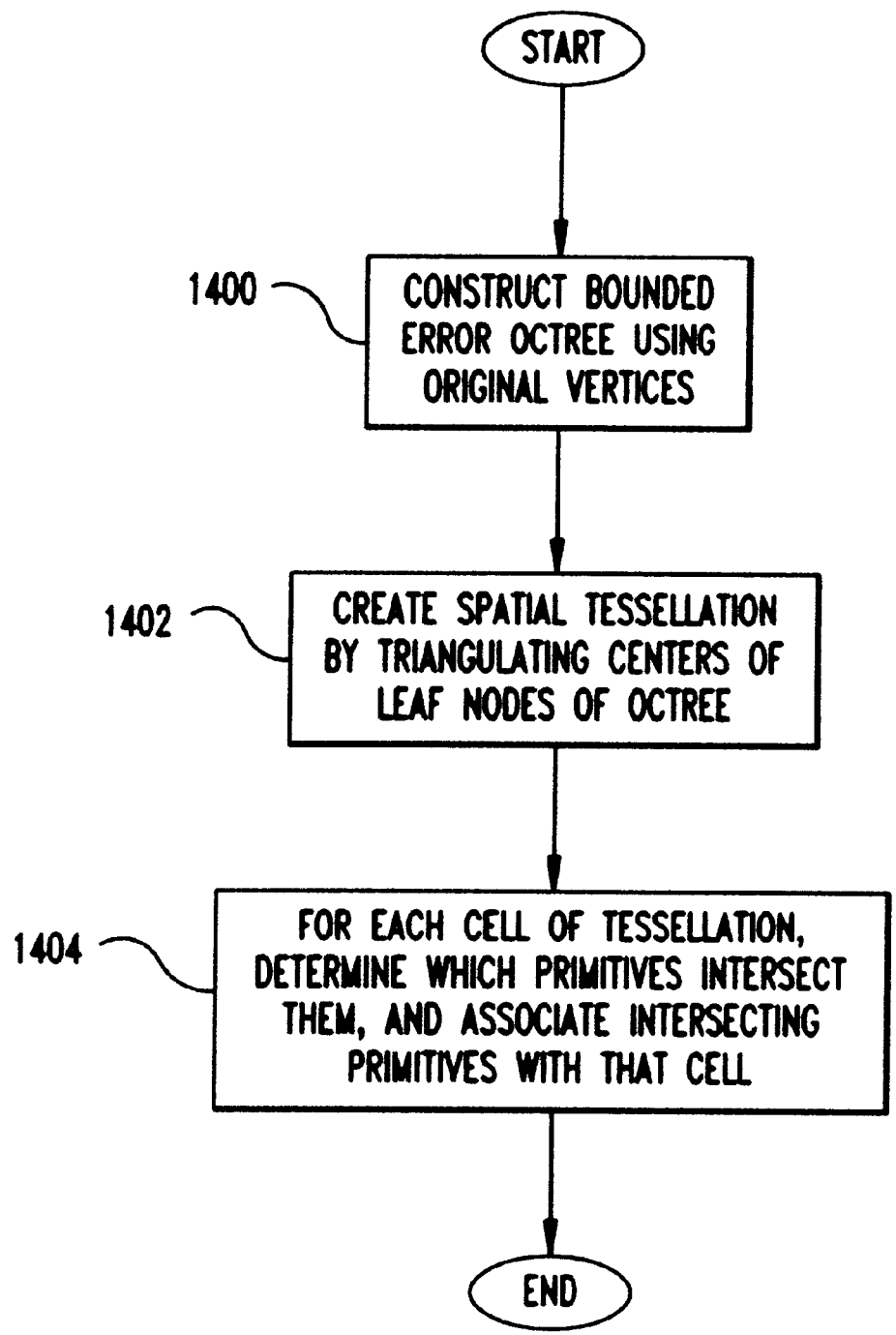
FIG. 5 is a flow chart showing the preferred space tessellation process.

FIG. 5 is a flow chart showing the preferred space tessellation process of step 140. The preferred spatial decomposition process characteristics are: simple traversal characteristics making it easy and computationally inexpensive to walk from cell to cell; good projection properties making the scene depth-orderable from any viewpoint using efficient linear-time projection algorithms and so, making it easy to estimate screen-space coverage; adaptive cell size to provide space filler efficiency such that it is possible to adaptively sample scene geometry, large cells being located in sparse areas and smaller cells in denser areas; and, a data structure that is easily built and stored efficiently. Accordingly, the preferred spatial data structure is a Delaunay triangulation, which is well known in the art.

As can be seen in the flow diagram of FIG. 5, a spatial decomposition $M$, which very simply adaptively samples the scene $S$ with points; then, $M$ is constructed as the Delaunay triangulation of the sample points; and, finally, individual primitives in $S$ are assigned to $M$. Accordingly, in step 1400 a rough (bounded-error) octree is constructed using only the original vertices. Then, in step 1402 treating the center of the octree leaves as the vertices of the Delaunay triangulation the spatial tessellation is created. Then, in step 1404 after building $M$, primitives are associated with cells using a naive assignment of the primitives in $S$ to $M$. Basically, the scene geometry is "scan-converted" into the mesh.

Figure 6:
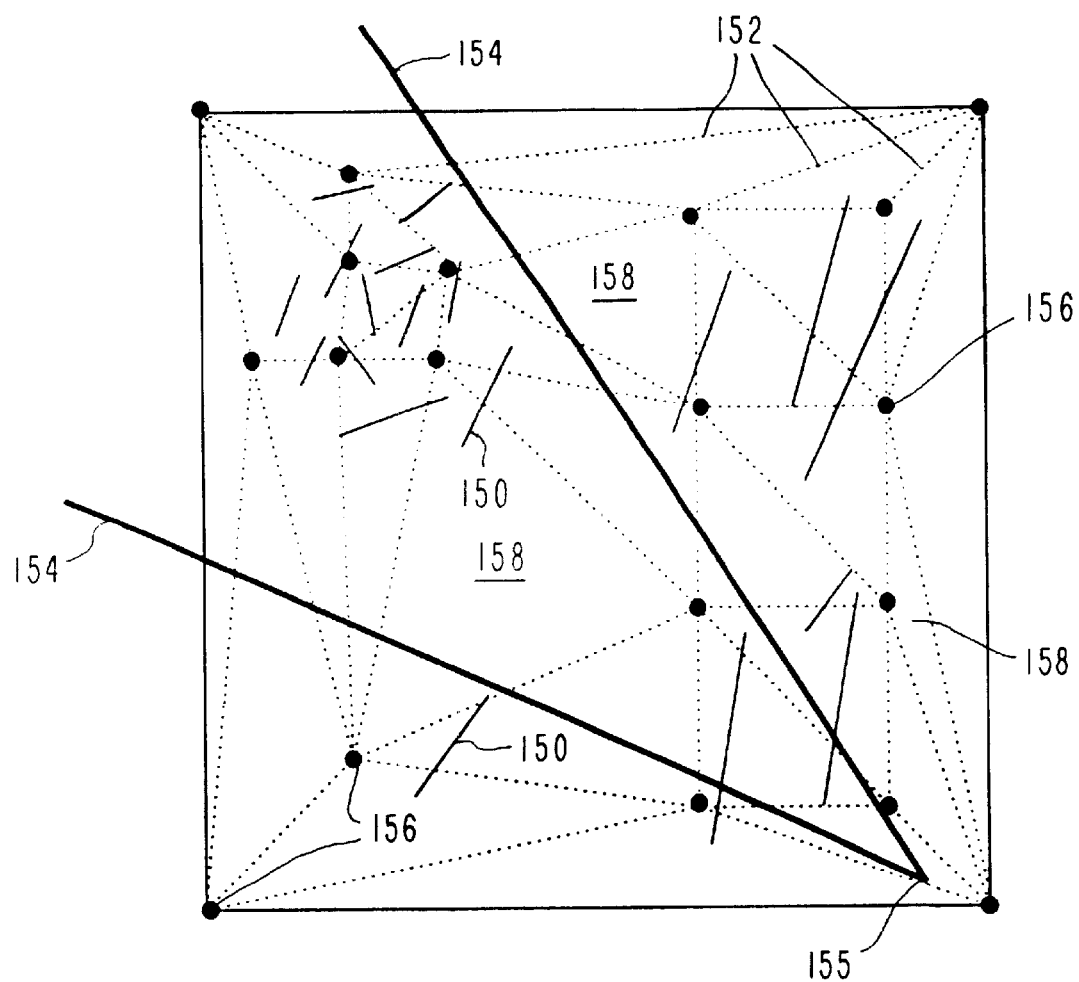
FIG. 6 is a representation of tessellated space with geometric representations having geometric attributes according to the preferred embodiment.

FIG. 6 is an example of tessellated space with geometric attributes for geometric representations resulting from step 140. The geometric attributes correspond to short line segments 150. The occupancy-based spatial tessellation is shown in dashed lines 152. The view frustum is a cone represented by a solid, thick lines 154, emanating from viewpoint or eyepoint 155 at the apex. The dark points 156 represent sample points for constructing the occupancy-based spatial tessellation.

After spatial decomposition in step 140, each of cells 158 of the resulting spatial decomposition has a list of the primitives (from $S$) assigned to it. In the preferred embodiment, each of the assigned primitives is either completely contained in the cell, or it intersects one of the cell's boundary faces 152. Each cell's solidity value is determined by the number of primitives in that cell. In a final pass over the data during preprocessing, the maximum number of primitives in any cell is computed and used later in the process as a scaling factor.

FIG. 7 is a flow chart of the preferred embodiment geometric rendering process according to the present invention showing the preferred rendering loop executed in step 142 of FIG. 4. Accordingly, after computing the occupancy based spatial tessellation in step 140, the process enters the rendering loop in step 144 starting from a seed cell, which typically contains the eye position, and carves cells out of the tessellation, preferably along layers of primitives. In step 146, primitives are rendered to produce an image or frame until all primitives have been rendered or a predetermined budget condition is met. Image or frame rendering in step 146 continues until it is determined in step 148 that all of the images have been generated.

In the preferred rendering step 142, the cells 158 are traversed in roughly front-to-back order. Thus, primitives along each pixel are ordered by their positive distance to the eye point. A rank is assigned to the ordered primitives based on each primitive's visibility in each of the pixels that the primitive touches. Preferably, those primitives that are visible in any cell 158 are assigned a lower rank, 1 for example.

Then, in step 146 an attempt is made to project the modeling primitives by layers, that is, all primitives of rank 1, then rank 2 and so on. This is done by always projecting a front cell $\mathcal{F}$ from a collection or set (the front) of unprojected cells 158 closest to the viewpoint 155. The set, the front, are immediate candidates for projection. Also, the front cell $\mathcal{F}$ is least likely to be occluded based on computed cell solidity values. Initially, the front is empty, and as cells are inserted, their solidity values are accumulated to reflect their position during the traversal. Each time a cell 158 in the front is projected, all of the geometric primitives assigned to that projected cell are rendered.

Any one of several types of budgets may be employed of the present invention. Preferably, a triangle count budget is used for time-critical rendering. However, a priority budget related to cell rank may be employed to result in a more scene-independent budgeting scheme. Accordingly, for the present invention the visible set is not computed exactly. Instead, a solidity-based ordering is combined with a budget to provide an optimal priority based scene rendering.

Figure 8B:
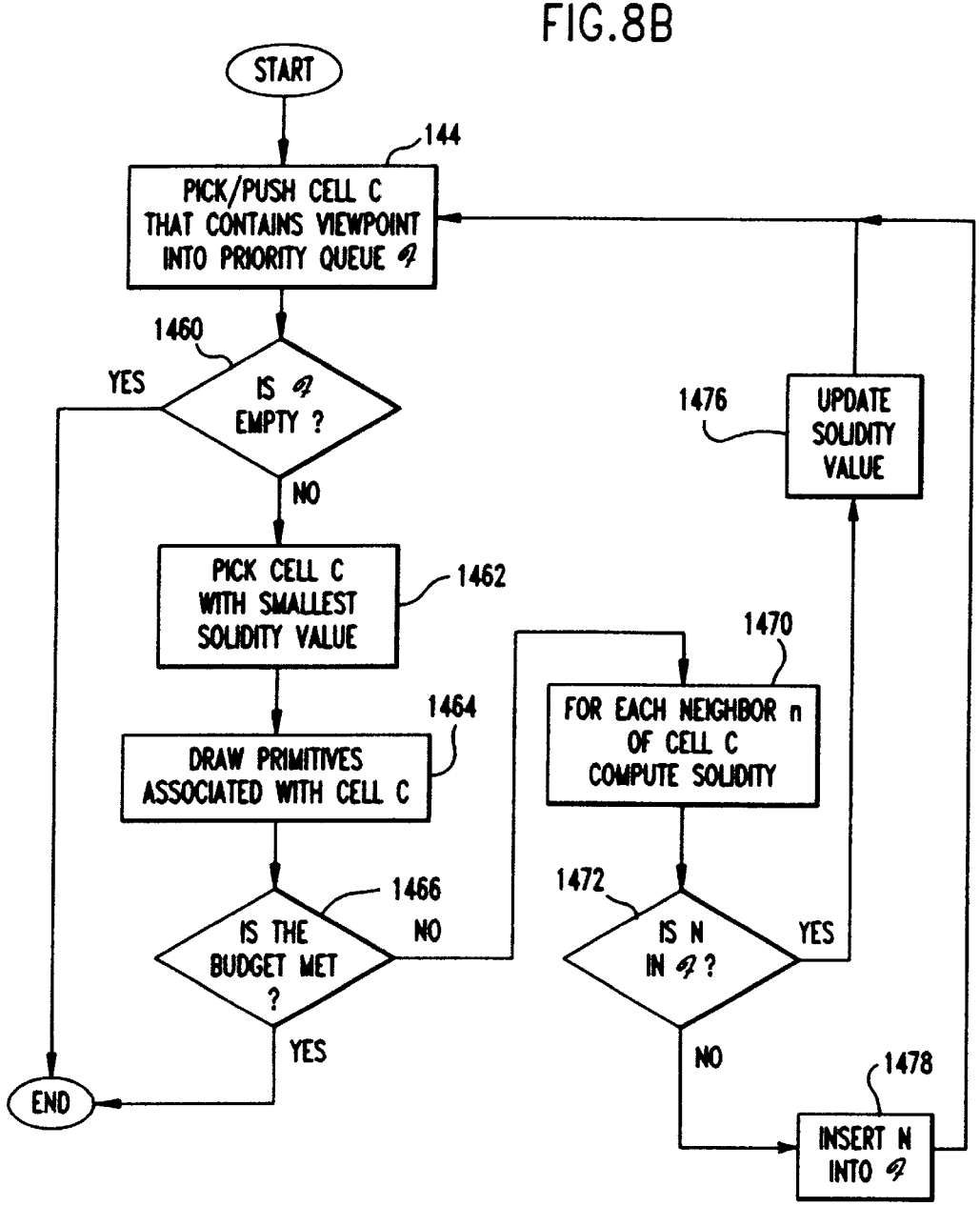

FIG. 8A is pseudo-code for the rendering loop of step 142, but, primarily for the scene rendering step 146 and FIG. 8B is a corresponding flow chart. First, in step 1460, a test is conducted to determine if there are any cells remaining in the scene to project. If there are no cells to project, a break is initiated. Otherwise, in step 1462, function min( ) returns the minimum element in the priority queue $\mathcal{F}$. In step 1464, function project(c) renders all the elements assigned to c; project(c) also keeps counts on the number of primitives actually rendered. In step 1466, function reached_budget( ) returns true if k primitives have been rendered already, with k is the budget target in this example, and if a true is returned, in step 1468 a break is initiated. Then, in step 1470, function cell_adjacent_to(c) lists the cells adjacent to c, the current cell. In step 1472, function projected(n) returns true if cell n has already been projected, and if a true is returned, in step 1474 rendering continues. Then, in step 1476, function update_solidity(n, c) computes the updated solidity ρ of cell n, based on the fact that c is one of its neighbors, and has just been projected. Finally, in step 1478, function enqueue(n, ρ) places n in the queue with a solidity ρ. If n was already in the queue, the function enqueue(n, ρ) will first remove n, and re-insert it with the updated solidity value. Then, in step 148 a check is made whether all images, as desired by the user, have been generated. If not, rendering continues on the next frame in step 146.

Figure 9:
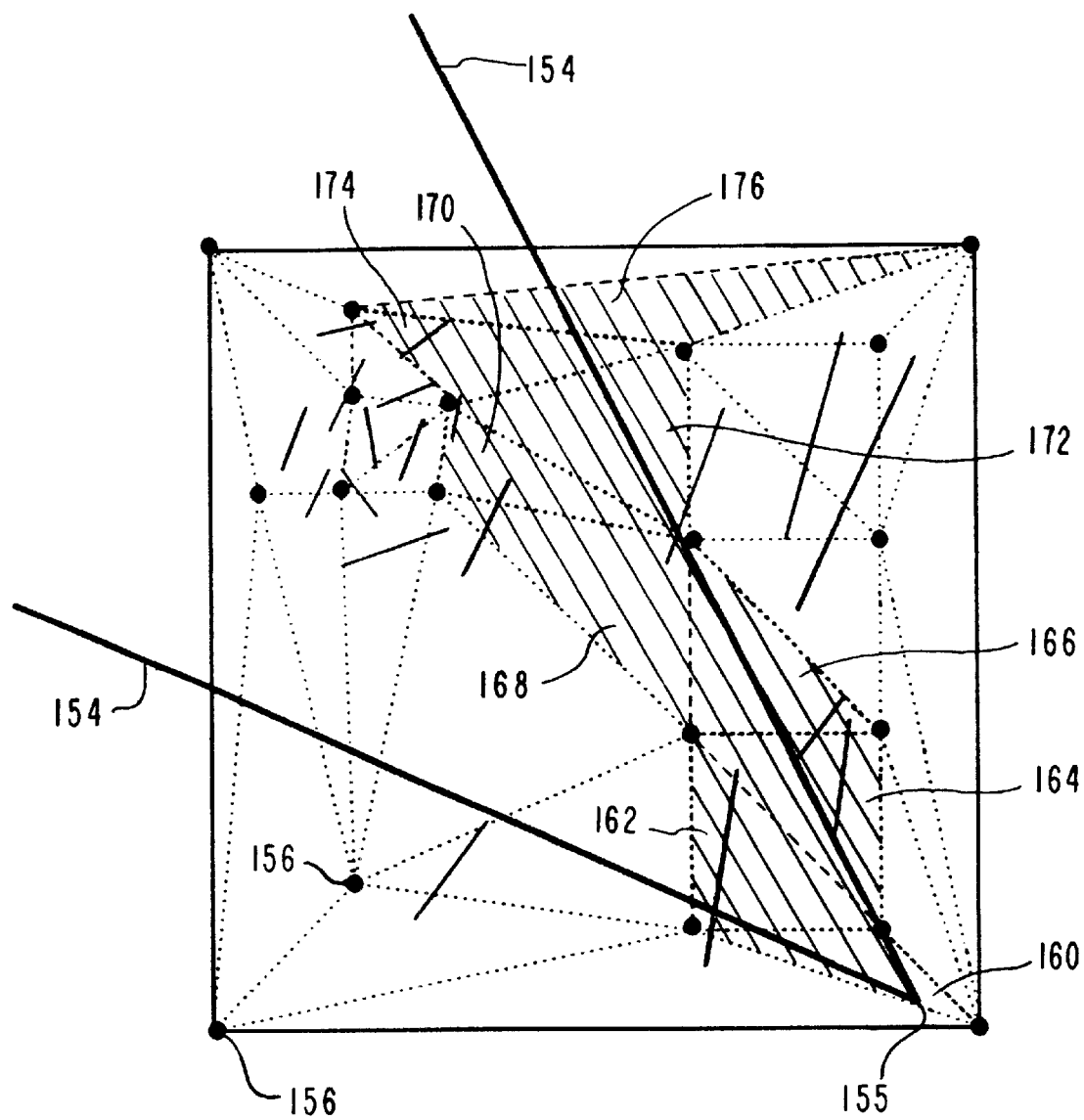
FIG. 9 is a representation of a typical subspace traversal of step 142 of the space in FIG. 6.

FIG. 9 is a representation of a subspace traversal of the space in FIG. 6 in step 142, as further described with reference to FIGS. 7, 8A and B. The rendered areas are marked by shaded regions 160, 162, 164, 166, 168, 170, 172, 174 and 176. In this example, each cell is rendered according to their numbered sequential label. Unshaded cells are unrendered and occluded by geometry in rendered cells. At any given point during rendering, cells are removed from the front, i.e., from the priority queue in "solidity order," therefore, the cells with the smallest solidity are projected before the one with larger solidity. The solidity of a cell c used in the rendering algorithm is not an intrinsic property of the cell itself. Instead, a set of conditions are used to estimate, roughly, the visibility likelihood of a cell and, to assure that cells that are more likely to be visible get projected before cells that are less likely to be visible.

Figure 10B:
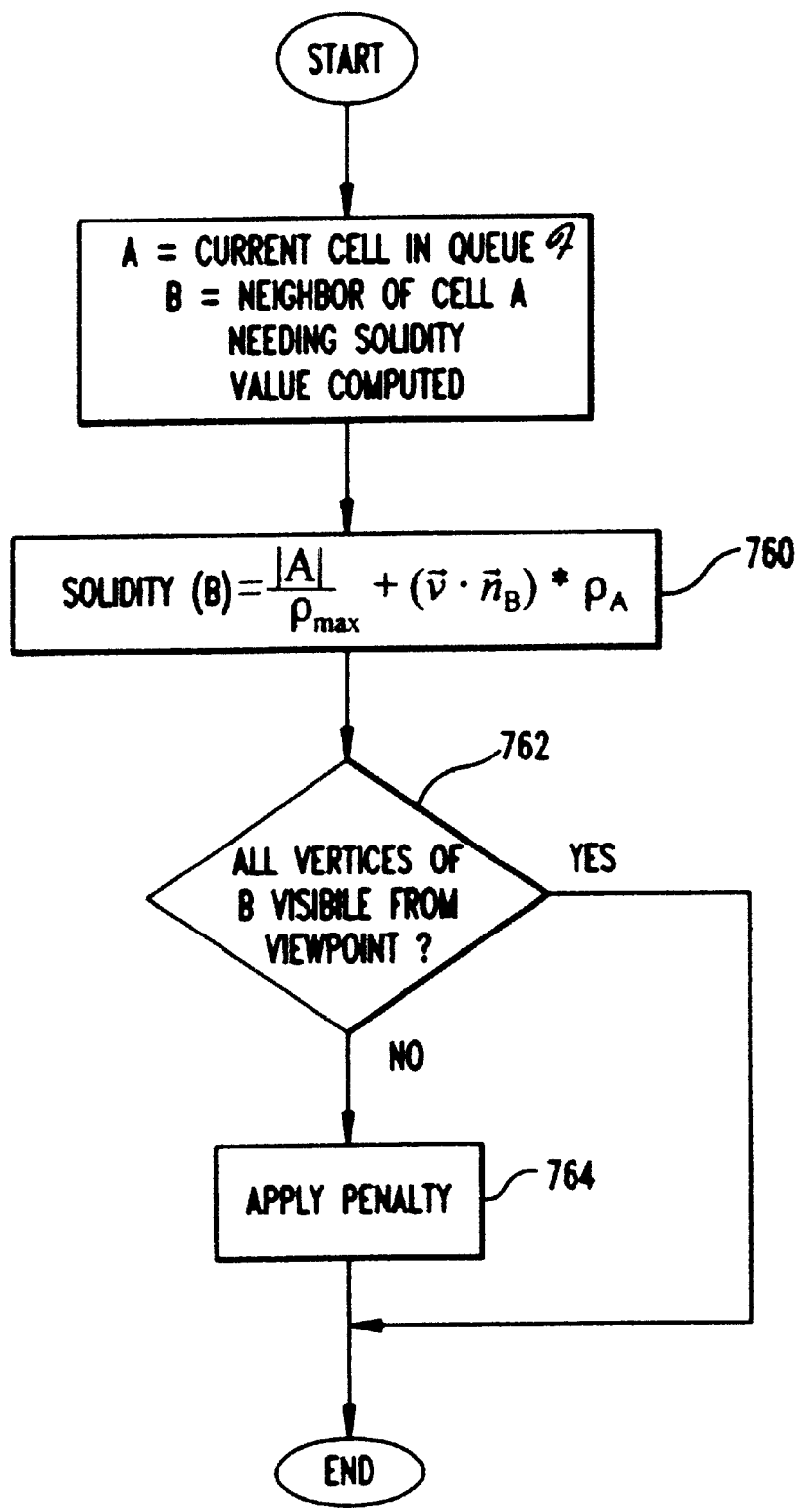

Accordingly, FIG. 10A is pseudo-code and FIG. 10B is a corresponding flow chart of the preferred solidity computation step 1476 of FIGS. 8A–B. The solidity is a numerical representation of how difficult it is for the viewer to see a particular cell. The actual solidity value of a particular cell c in FIG. 8A (substituted for A in FIGS. 10A–B) is not defined, intrinsically, but is defined in terms of the solidity of the cells that intersect the closure of a segment from the cell c to the eye point. The number of primitives inside c is normalized $$\left(\frac{|A|}{\rho_{max}}\right)$$

and, in step 760, a comparison is made based on transferring the accumulated solidity of the cell (A) to an adjacent cell (B) based on the orthogonality of the face shared between cells to the view direction.

This transfer is maximized if the face shared between cells has a normal vector that is parallel to the view direction and, the cell is in a "star-shaped" position. So, in step 762, to avoid projecting cells (with low solidity values) that are occluded by unprotected cells in the front (with higher solidity values) the cells in the front are forced to be as star-shaped as possible. Thus, all of the vertices of the cells newly-inserted in the front can be seen by the viewer. If the alignment is not star shaped, in step 764 penalties are calculated and, in step 766, applied to the transfer. Accordingly, by carefully tailoring the traversal algorithm to the occupancy-based tessellation, excellent frame rates can be achieved with low preprocessing and rendering costs.

Figure 11A:
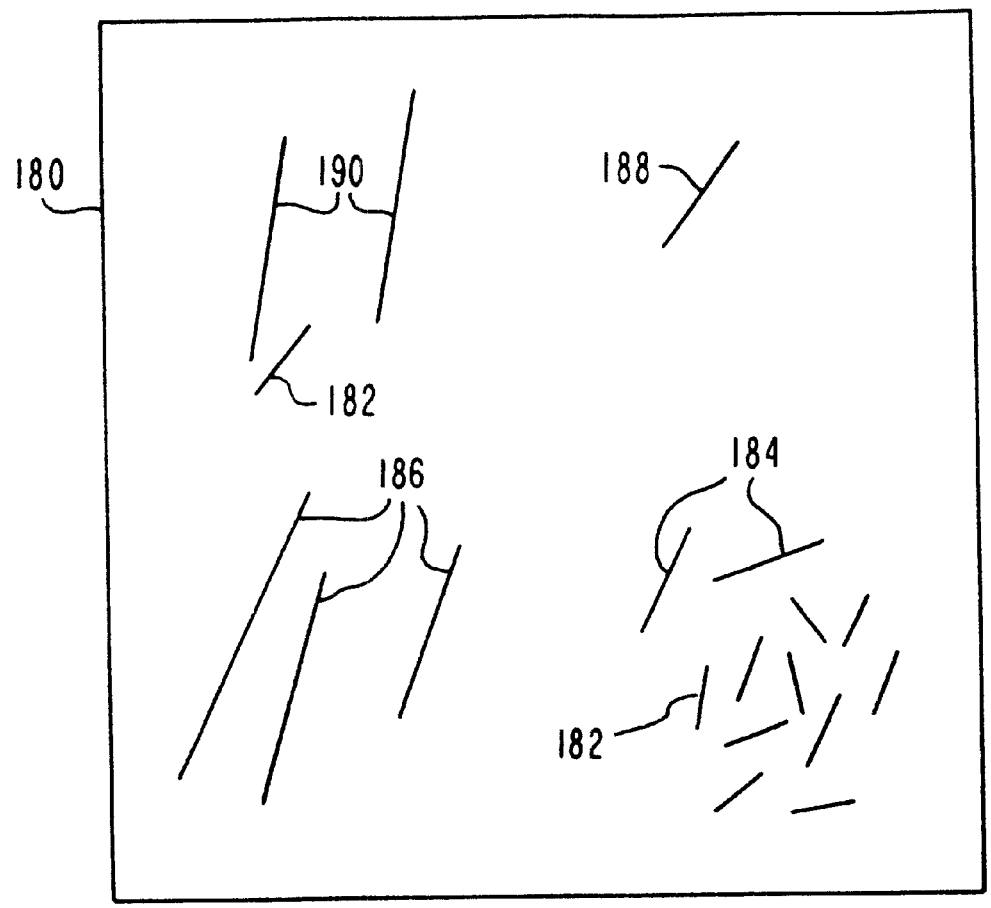
FIGS. 11A–C are a second example of space tessellation according to the preferred embodiment.
Figure 11B:
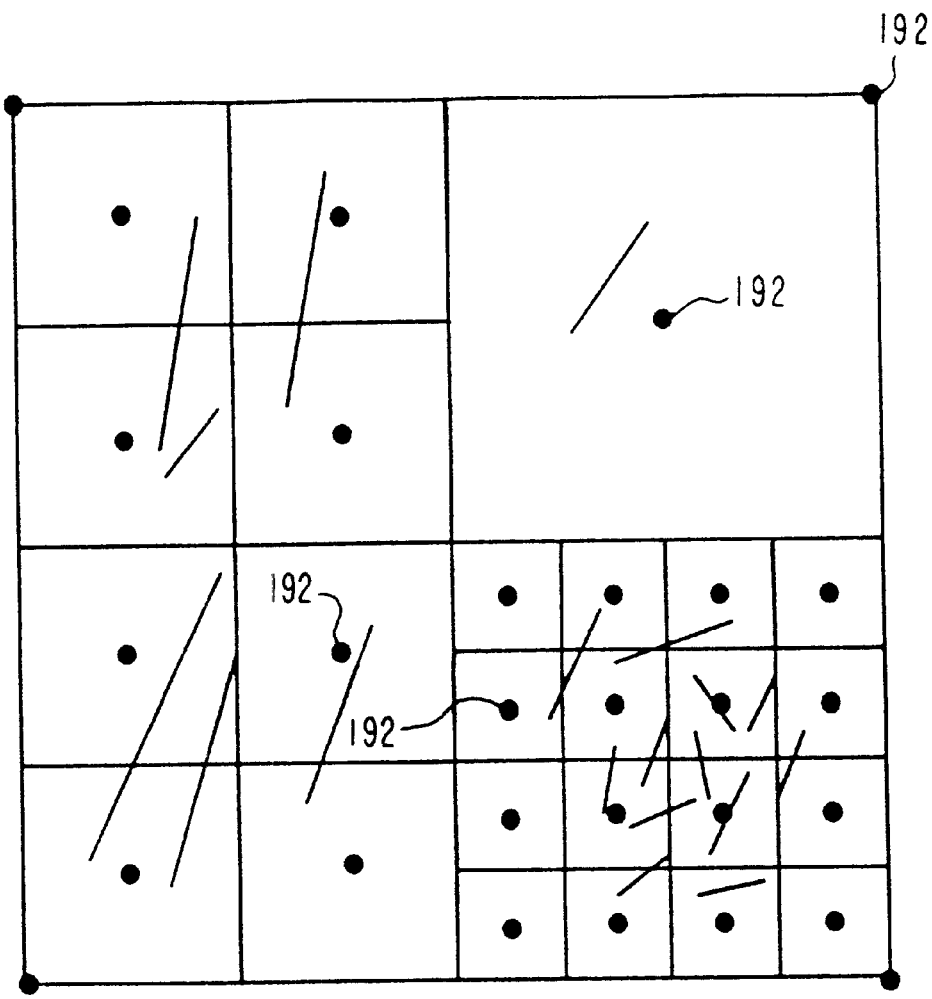
Figure 11C:
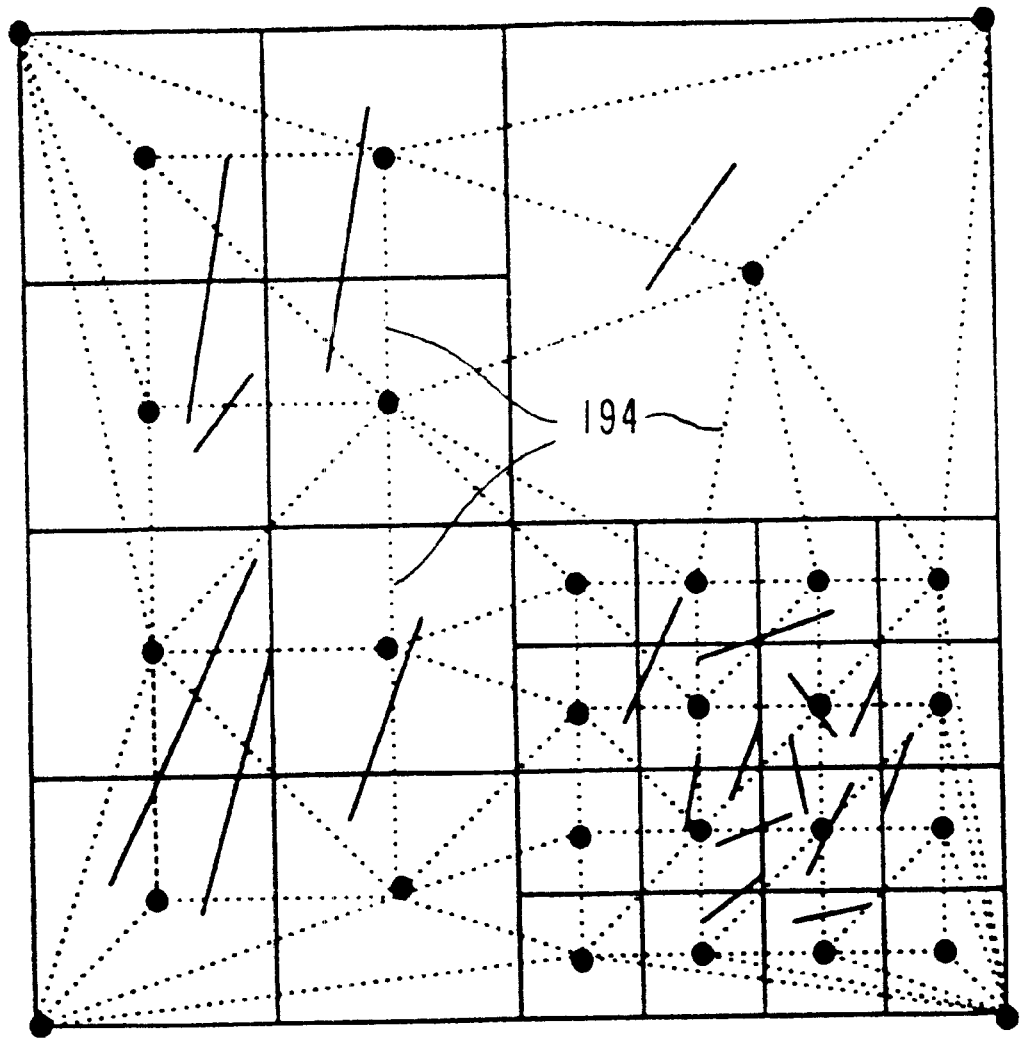

FIG. 11A is another example of a preferred embodiment space tessellation of a scene 180. In the example of FIG. 11A geometric attributes for the scene are represented by line segments 182, 184, 186, 188 and 190. In FIG. 11B, a spatial decomposition tree, a quadtree in this 2D scene, is added. In 3D the spatial decomposition tree would be an octree. The spatial decomposition tree determines the sample points 192 for computing the occupancy-based spatial tessellation. Next, in FIG. 11C, an occupancy-based spatial tessellation is added as represented by dotted lines 194. In this example, a Delaunay Triangulation for the occupancy-based spatial tessellation. Again, other techniques for sampling, and actually constructing the occupancy-based tessellation may be substituted.

Figure 12A:
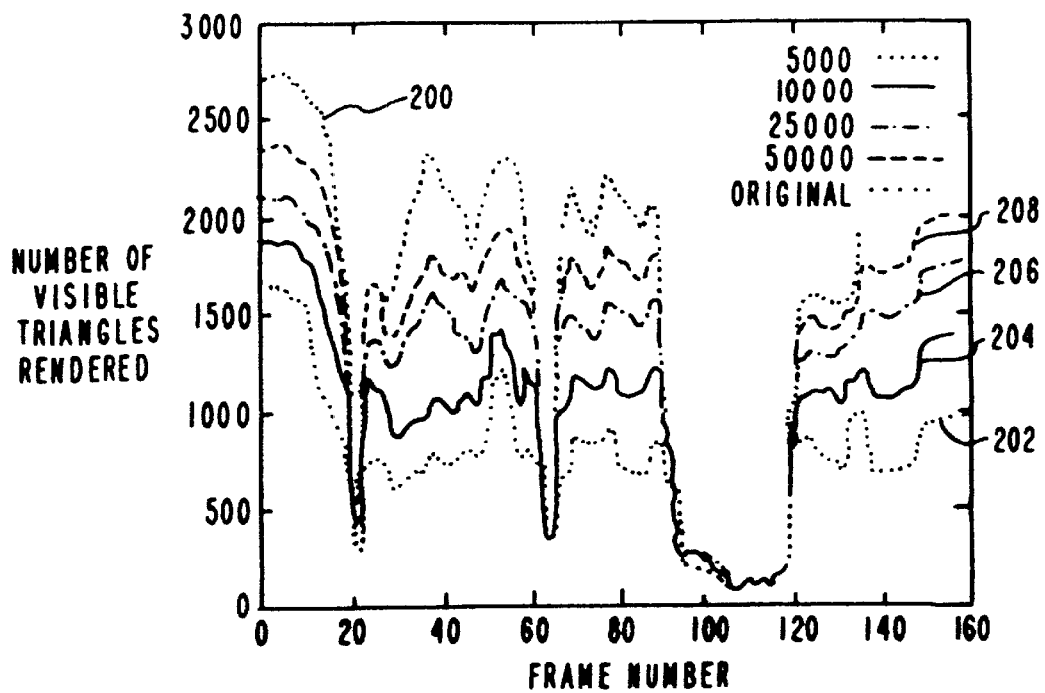
FIGS. 12A–D are an example of a rendered image after processing according to the preferred embodiment of the present invention.
Figure 12B:
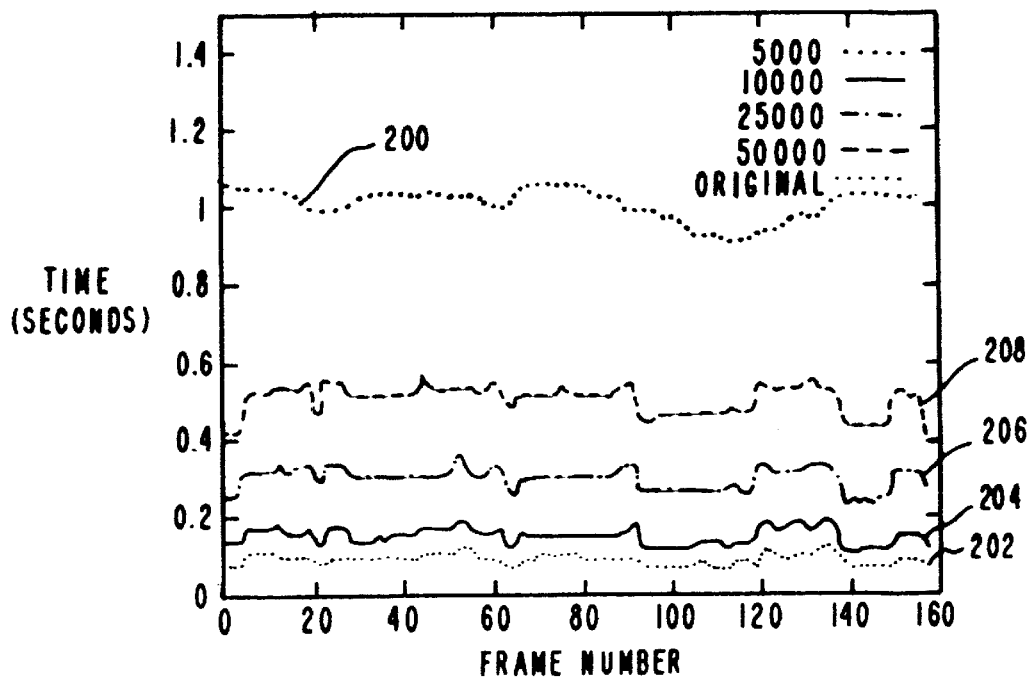
Figure 12C:
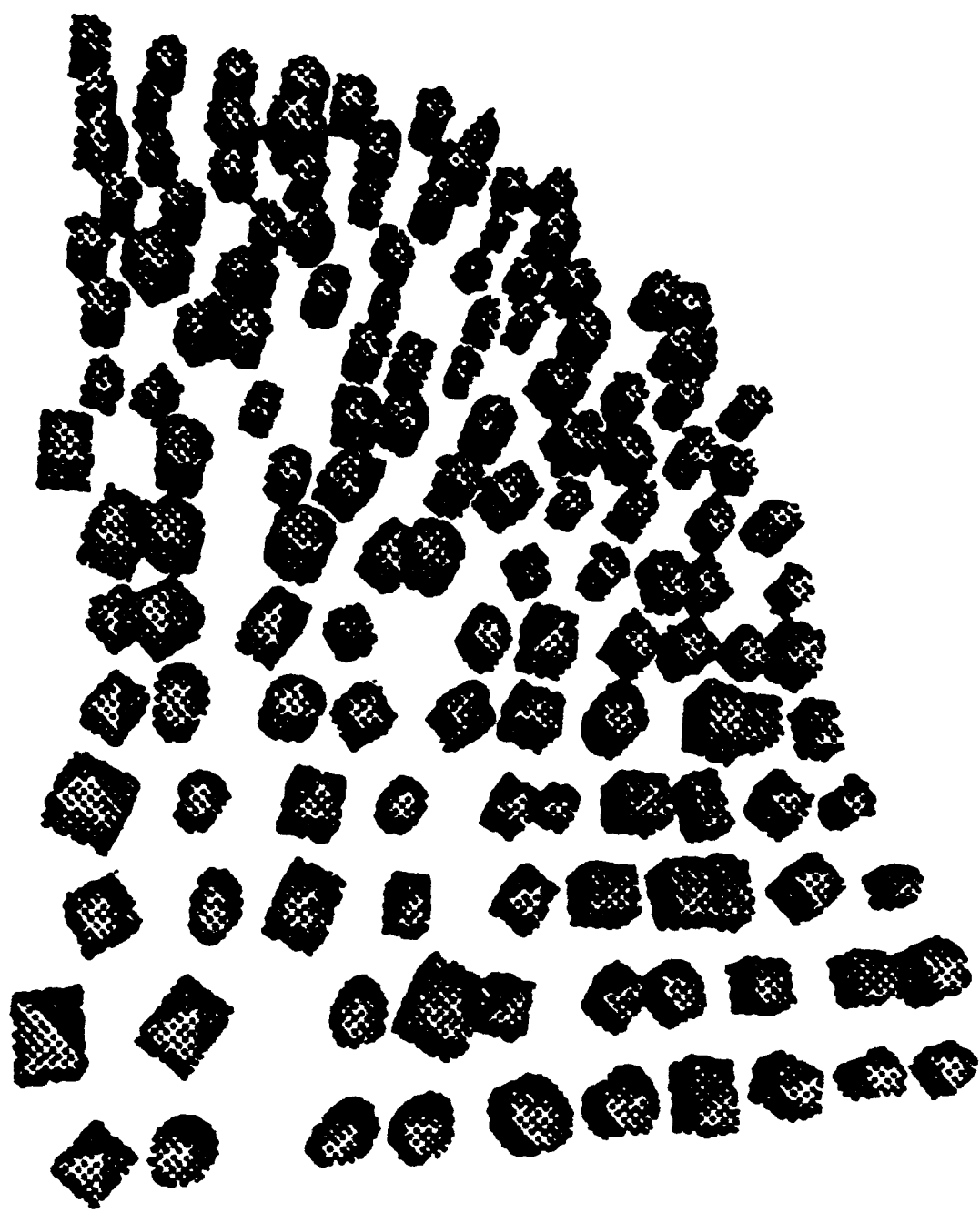
Figure 12D:

FIGS. 12A–D show an example of a rendered image after processing according to the preferred embodiment of the present invention. FIG. 12A shows the number of visible primitives for a sequence of images, each image being referred to as a frame. For comparison, the number of rendered triangles for representative budget values is included. The top curve 200 is the total number of visible primitives for each given frame, with visible triangles for budgeted values of 1%, 2%, 5% and 10% represented by curves 202, 204, 206 and 208, respectively. FIG. 12B shows the corresponding rendering times. FIG. 12C is an image of all the visible triangles corresponding to the top curve and, FIG. 12D is an image of the 10% budgeted set corresponding to the bottom curve. As is apparent from FIGS. 12A–D, the preferred embodiment of the present invention reduced rendering time for this example by over a factor of two, while the number of visible primitives is approximately 90% of the total number of visible primitives.

While the invention has been described in terms of preferred embodiments, those skilled in the art will recognize that the invention can be practiced with modification within the spirit and scope of the appended claims.

We claim:

1. A method of rendering a three dimensional image on a display, said method comprising the steps of:
    a) forming an occupancy-based tessellation of a space to be rendered; and
    b) rendering an image using a solidity-based traversal of said occupancy-based tessellation.

2. The method of claim 1 wherein the rendering step (b) comprises the steps of:
    i) identifying and rendering a seed cell;
    ii) identifying cells adjacent to said rendered cell, said identified cells having an assigned priority;
    iii) selecting and rendering one of said identified cells based on said selected cell's assigned priority; and
    iv) repeating steps (ii) and (iii) until all visible primitives have been rendered.

3. The method of claim 2 wherein the step (iv) of repeating steps (ii) and (iii) further comprises stopping if a budget objective is met.

4. The method of claim 3 wherein the budget value is a cell priority rank.

5. The method of claim 3 wherein the budget value is a maximum triangle count.

6. The method of claim 1 wherein the rendering step (b) comprises the steps of:
    i) setting an end test condition;
    ii) selecting a cell from a group of one or more cells, each of said cells having an assigned priority, said selected cell having the highest priority of said one or more cells;
    iii) rendering all elements assigned said selected cell and maintaining a running count of all rendered said elements;
    iv) checking to determine if said test has been met and beginning a next scene when said test is determined to have been met;
    v) identifying all cells adjacent to said selected cell;
    vi) determining if any identified adjacent cell is included in said group;
    vii) updating a solidity value of any adjacent cell included in said group;
    viii) assigning a solidity value to any adjacent cell determined not included in said group and adding to said group the previously unincluded adjacent cell;
    ix) repeating steps (ii)–(viii) until said scene is determined to have been rendered in step (iv); and
    x) checking whether all scenes have been generated and repeating steps (ii)–(ix) until all scenes have been rendered.

7. The method of claim 6, wherein the step (vii) of updating the solidity value for each included adjacent cell comprises the steps of:
    A) comparing the accumulated solidity of the rendered cell to said adjacent cell according to the orthogonality of a common face in a view direction;
    B) determining whether all vertices of said adjacent cell are visible from a viewpoint; and
    C) calculating an applying a penalty to any said adjacent cell determined not to have all vertices visible from said viewpoint.

8. The method of claim 6, wherein the end test condition includes a budget target.

9. The method of claim 1 wherein the step (a) of forming the occupancy-based tessellation comprises the steps of:
    i) constructing a bounded-error octree using vertices of shapes within a scene to be rendered, said scene including a plurality of primitives;
    ii) triangulating the center of said octree leaves to create cells forming a spatial tessellation of said scene;
    iii) determining for each of said primitives, which of said cells said each primitive intersects; and
    iv) associating with each of said cells each determined intersecting primitive.

10. The method of claim 9, wherein the step (ii) of triangulating the center of said octree leaves comprises a Delaunay triangulation of the sample points in said scene.

11. A method as in claim 1 wherein the step a) of forming an occupancy-based tessellation of space divides objects in said space into cells, each cell being assigned a solidity value directly proportional to its likelihood of occluding other cells and, the solidity-based traversal in step b) is according to cell solidity values.

12. A computer program product for rendering a three dimensional image on a display, said computer program product comprising a computer usable medium having computer readable program code thereon, said computer readable program code comprising:
    computer readable program code means for forming an occupancy-based tessellation of a space to be rendered; and
    computer readable program code means for rendering an image using a solidity-based traversal of said occupancy-based tessellation.

13. A computer program product as in claim 12, wherein the computer readable program code means for forming the occupancy-based tessellation comprises:
    computer readable program code means for constructing a bounded-error octree using vertices of shapes within a scene to be rendered, said scene including a plurality of primitives;

computer readable program code means for triangulating the center of said octree leaves to create cells forming a spatial tessellation of said scene;

computer readable program code means for determining for each of said primitives, which of said cells said each primitive intersects; and computer readable program code means for associating with each of said cells each determined intersecting primitive.

14. A computer program product as in claim 13, wherein the computer readable program code means for triangulating the center of said octree leaves comprises: computer readable program code means for a Delaunay triangulation of the sample points in said scene.

15. A computer program product as in claim 12, wherein the computer readable program code means for rendering the image comprises:

computer readable program code means for identifying and rendering a seed cell;

computer readable program code means for identifying cells adjacent to said rendered cell, said identified cells having an assigned priority; and computer readable program code means for selecting and rendering one of said identified cells based in said selected cell's assigned priority.

16. A computer program product as in claim 15, wherein the computer readable program code means for rendering the image further comprises:

computer readable program code means for determining if a budget objective is met.

17. A computer program product as in claim 16, wherein the budget value is a cell priority rank.

18. A computer program product as in claim 16, wherein the budget value is a maximum triangle count.

19. A computer program product as in claim 13, wherein the computer readable program code means for rendering the image comprises:

computer readable program code means for identifying a seed cell from a group of cells according to an assigned priority and rendering all elements within said seed cell;

computer readable program code means for determining when an end test condition has been met, image rendering continuing unless said end test condition has been determined to have been met;

computer readable program code means for identifying cells adjacent to said rendered cell, said identified cells belonging to said group having a solidity value updated and said identified cells not belonging to s aid group having a solidity value assigned; and computer readable program code means for determining whether all cells within a scene have been rendered and whether all scenes have been rendered.

20. A computer program product as in claim 12 further comprising:

computer readable program code means for assigning a solidity value to each cell in said space, said solidity-based traversal being based on said solidity value.

21. An image processing system for rendering a three dimensional image on a display comprising:

means for forming an occupancy-based tessellation of a space; and means for rendering an image using a solidity-based traversal of said occupancy-based tessellation.

22. An image processing system as in claim 21 wherein the means for forming the occupancy-base d tessellation comprises:

means for constructing a bounded-error octree from vertices of shapes within a scene to be rendered, said scene including a plurality of primitives;

means for triangulating the center of s aid octree leaves to create cells forming a spatial tessellation of said scene; and means for associating sa id cells with intersecting primitives.

23. An image processing system as in claim 22, where in the means for triangulating the center of said octree leaves comprises:

means for a Delaunay triangulation of the sample points in said scene.

24. An image processing system as in claim 21, wherein the means for rendering the image comprises:

means for identifying and rendering a cell from a group of cells based on an assigned priority; and means for identifying cells adjacent to said rendered cell.

25. An image processing system as in claim 24, further comprising:

means for determining if a budget objective is met.

26. An image processing system as in claim 21, wherein the means for rendering the image comprises:

means for setting an end test condition;

means for selecting a cell from a group of cells, each of said cells of said group having an assigned priority, said selected cell having the highest priority of said group of cells;

means for rendering all elements assigned said selected cell and maintaining a running count of all rendered said elements;

means for identifying all cells adjacent to said selected cell;

means for assigning a solidity value to said adjacent cells; and means for checking to determine if said test has been met and beginning a next scene when said test is determined to have been met.

27. An image processing system as in claim 21 further comprising:

means for assigning a solidity value to each cell in said space, said solidity-based traversal being based on said solidity value.

* * * * *

UNITED STATES PATENT AND TRADEMARK OFFICE
CERTIFICATE OF CORRECTION

PATENT NO. : 6,414,680 B1
DATED : July 2, 2002
INVENTOR(S) : Klosowski et al.

It is certified that error appears in the above-identified patent and that said Letters Patent is hereby corrected as shown below:

<u>Title page,</u>
Item [74], *Attorney, Agent or Firm*, change "Peercello" to -- Percello --.

<u>Column 9,</u>
Line 53, delete "s aid" and insert -- said --.

<u>Column 10,</u>
Line 11, delete "occupancy-base d" and insert -- occupancy-based --;
Line 16, delete "s aid" and insert -- said --;
Line 19, delete "s aid" and insert -- said --; and
Line 21, delete "where in" and insert -- wherein --.

Signed and Sealed this

Nineteenth Day of November, 2002

*Attest:*

*Attesting Officer*

JAMES E. ROGAN
*Director of the United States Patent and Trademark Office*